United States Patent [19]

Lee et al.

[11] Patent Number: 5,177,417

[45] Date of Patent: Jan. 5, 1993

[54] METHOD AND APPARATUS FOR COMMUTATION OF A BRUSHLESS DC MOTOR

[75] Inventors: David R. Lee, San Jose; Theodore D. Rees, Mountain View, both of Calif.

[73] Assignee: R-Byte, Inc., San Jose, Calif.

[21] Appl. No.: 741,787

[22] Filed: Aug. 6, 1991

[51] Int. Cl.5 .............................................. H02P 7/00
[52] U.S. Cl. ........................................ 318/254; 318/85
[58] Field of Search ............... 312/254, 138, 439, 661, 312/650, 85, 700, 705, 715

[56] References Cited

U.S. PATENT DOCUMENTS

| | | |
|---|---|---|
| 3,883,785 | 5/1975 | Fulcher et al. |
| 4,042,863 | 8/1977 | von der Heide ............ 318/254 |
| 4,511,827 | 4/1985 | Morinaga et al. ............ 318/254 |
| 4,591,774 | 5/1986 | Ferris et al. ............ 318/254 X |
| 4,599,561 | 7/1986 | Takahashi et al. |
| 4,661,756 | 4/1987 | Murphy et al. ............ 318/138 X |
| 4,761,598 | 8/1988 | Lovrenich ............ 318/254 X |
| 4,832,576 | 5/1989 | Deguchi et al. ............ 318/254 X |
| 4,910,448 | 3/1990 | Tomisawa et al. |

Primary Examiner—A. Jonathan Wysocki
Attorney, Agent, or Firm—Lyon & Lyon

[57] ABSTRACT

An apparatus and method for the commutation of a brushless dc motor having a rotor and a plurality of coils, and an encoder generating quadrature signals responsive to the rotation of the rotor. The commutation apparatus comprises a commutation control device, coupled to the encoder, for controlling the sequence of motor coil energization utilizing the quadrature signals. The commutation method utilizes the quadrature signals for composite signal generation, rotor rotational direction and position to achieve precise commutation. Precision commutation is achieved without the need for any additional commutation sensing devices.

3 Claims, 2 Drawing Sheets

COMPOSITE MOTOR-ENCODE

METHOD AND APPARATUS FOR COMMUTATION OF A BRUSHLESS DC MOTOR

FIELD OF THE INVENTION

The present invention relates generally to the field of commutation of motors and more particularly to commutation of brushless dc motors using magneto-resistive encoder signals.

BACKGROUND OF THE INVENTION

A brushless dc motor typically has a number of permanent magnets mounted on a rotor and a set of electromagnetic coils mounted on a stator. The rotor is made to rotate by energizing the coils in a specific sequence relative to the angular position of the rotor. The function of energizing the coils at specific points in the rotation is called "commutation" of the motor.

One typical means of commutation utilizes sensing devices (for example Hall cells) mounted on the stator for sensing the angular position of the rotor. Electronic circuits connected to the sensing devices detect the passage of the rotor past the sensing devices and switch the energy into a different electromagnetic coil (commutates) at that instant. Such prior art commutation means is well known and since it is relatively simple to implement, it is widely employed. However, such prior art commutation devices require the rotor sensing devices and, further, the efficiency of the motors utilizing such commutation devices depends critically on the precise placement of the sensing devices when the motor is manufactured. That is, if the sensing devices are not accurately positioned, the motor will not operate efficiently.

Another commutation means which is becoming more widely used is based on back electromotive force (EMF) sensing. When the rotor rotates, an electromagnetic field is induced into the coils which are not currently energized (the back EMF field). By sensing the back EMF field, the commutation points of the motor may be determined. Back EMF commutation has the advantage that it does not require the rotor sensing devices. However, back EMF commutation has the disadvantage of performance degradation when the motor is moving slowly or is idle. By nature, the strength of the induced back EMF is proportional to the speed of the magnets passing by the coils. At slow speeds or at idle, then, the back EMF field is weak and not easily sensed and the commutation may not be properly performed.

Many brushless dc motors are used in applications wherein motor speed is controlled by servo-control systems. Such servo-control systems require a feedback signal from the motor indicating the motor speed. Such feedback is typically supplied utilizing a magneto-resistive (MR) encoder. Such an MR encoder has a magnetized ring around the circumference of the motor rotor and an MR sensor mounted on the motor stator. As the motor rotor rotates, the magnetic poles in the ring pass by the MR sensor, generating a series of pulses having a frequency proportional to the angular speed of the rotor. MR encoders are typically magnetized to provide from fifty to several hundred pulses per revolution of the rotor.

SUMMARY OF THE INVENTION

A principal object of this invention is to provide an improved motor commutation apparatus and method. Accordingly, this is an apparatus and method for the commutation of a brushless dc motor having a rotor and a plurality of coils, and a magneto-resistive encoder generating quadrature signals responsive to the rotation of the rotor. The commutation apparatus comprises a commutation control device, coupled to the encoder, for controlling the sequence of motor coil energization utilizing the quadrature signals. The commutation method utilizes the quadrature signals for composite signal generation and rotor rotational direction and position determination to achieve precise commutation.

Precision commutation is achieved without the need for any additional commutation sensing devices (such as Hall sensors). Therefore, accurate commutation is achieved using fewer parts, simpler design and consequent higher reliability and greater efficiency. Further, in contrast with back EMF commutation devices, this invention operates efficiently at any motor speed since MR encoders are not differentially sensitive at different motor speeds.

A further understanding of the nature and advantages of the present invention may be realized by reference to the Detailed Description of the Invention and the attached drawings.

DETAILED DESCRIPTION OF THE INVENTION

Figure 1:
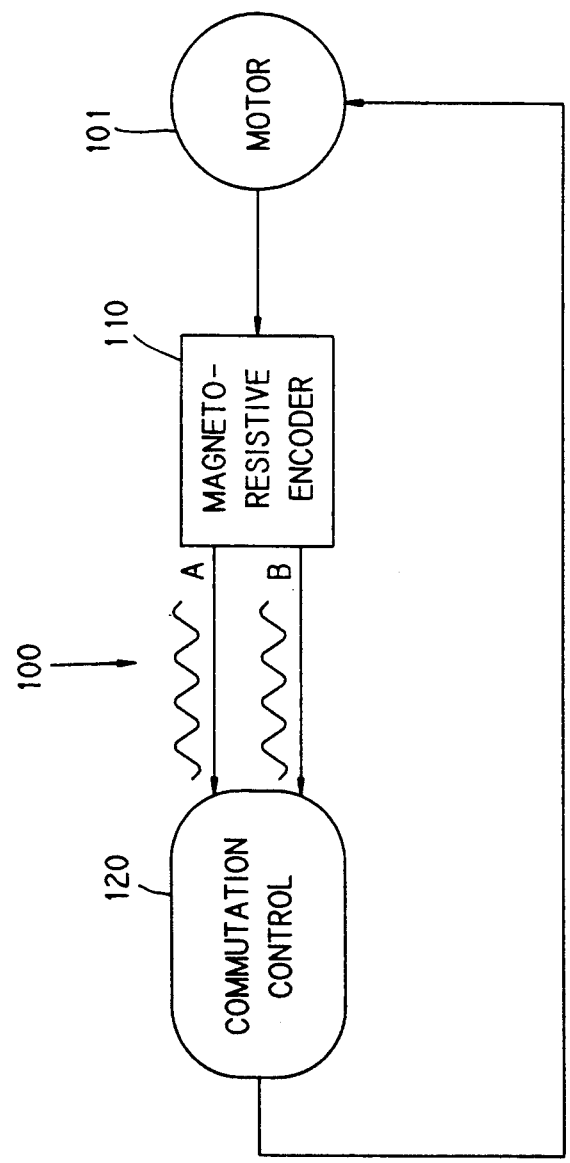
FIG. 1 is a block diagram of a commutation system according to the present invention showing a commutation control unit, a motor and a magneto-resistive encoder.

FIG. 1 is a block diagram showing commutation system 100 according to the present invention. An MR encoder 110 is coupled to a brushless dc motor 101. MR encoder 110 produces quadrature outputs, meaning two outputs (for example called A and B) which are waves 90° out of phase. MR encoder 110 transmits the A and B signals over channels A and B. In this case, the quadrature waves are substantially sinusoidal. An "encoder edge" refers to a zero crossing of the sinusoidal signal. Motor 101 has a plurality of coils (not shown), here called "coil 1", "coil 2", "coil 3", and so on. A commutation control unit 120, coupled to MR encoder 110, senses the outputs of MR encoder 110 and switches the coils on and off in sequence in coil 1, coil 2, coil 3, ... order to properly commutate the motor for rotation in a clockwise direction (in this example). Typical MR encoders are highly accurate which allows very accurate determination of angular position. For example, in an embodiment of the present invention, there are 768 total edges in the composite signal (discussed below).

Figure 2:
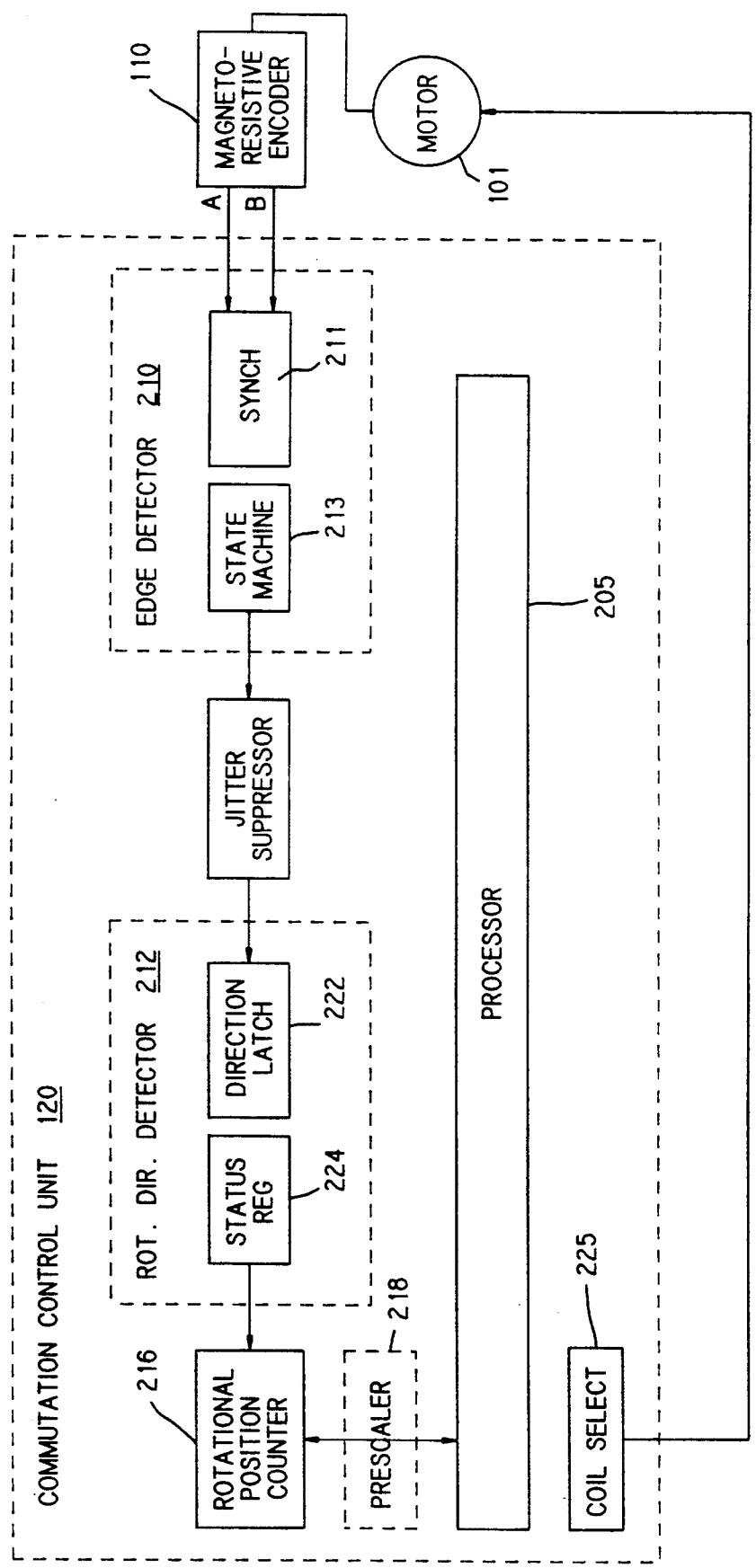
FIG. 2 is a block diagram of a commutation control unit and exemplary components according to the present invention.

FIG. 2 is a block diagram showing an embodiment of a commutation control unit 120 according to the present invention. Commutation control unit 120 switches the coils of motor 101 in the desired sequence. To do so, commutation control unit 120 must (1) respond to each edge of the MR encoder signal, (2) respond to changes in direction of motor rotor rotation, and (3) determine the rotational position of motor 101.

An edge detector 210 is coupled to MR encoder 110. A composite signal generator/jitter suppressor (CSG/JS) 214 is coupled to edge detector 210, a rotation direction detector 212 is coupled to CSG/JS 214, and a rotational position counter 216 is coupled to rotation direction detector 212. A processor 205 is coupled to detectors 210 and 212 and CSG/JS 214 and counter 216. Processor 205 is coupled to a coil select output register 225 which is coupled to motor 101. The coil switching sequence is performed by energizing sets of coils in motor 101 under the control of processor 205 through coil select output register 225.

Figure 3:
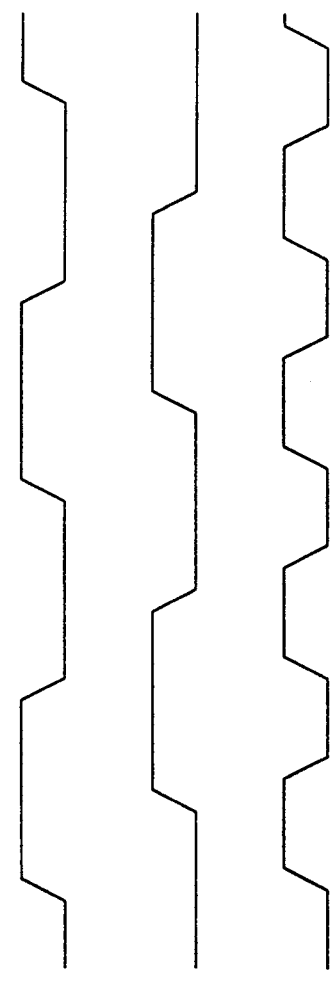
FIG. 3 is a timing diagram showing the relationship among quadrature signals A, B, and the motor-encode composite signal according to the present invention.

Edge detector 210 detects the zero crossings of the MR encoder signals and generates a series of edge signals described below. CSG/JS 214 generates a composite motor-encode signal containing all the edges from the A and B signals. FIG. 3 shows the relationship among A, B, and the motor-encode composite signals. In the preferred embodiment, edge detector 210 includes a synchronization device 211 coupled to a flip-flop (state machine) 213 which performs the composite signal generation.

It is difficult for commutation control unit 120 to respond to changes in the MR encoder signal (indicating motor rotor rotations) if motor 101 happens to be stopped on or near an encoder signal edge. The composite motor-encode signal (denoted MOT_ENC in this embodiment) is conceptually the exclusive OR of the A and B signals. However, if the composite motor-encode signal were merely a simple exclusive-OR, a mechanical vibration could cause the encoder signal edge to rapidly cross back and forth. The present invention suppresses this type of noise by ignoring the first encoder signal edge after a direction change. To do this, conceptually, the procedure is to (1) wait for an encoder signal edge on the A signal channel while ignoring the B signal channel, (2) wait for an encoder signal edge on channel B while ignoring channel A, and (3) return to step (1). An embodiment of this invention implements this procedure as described following.

The A and B signals are synchronized and edge-detected, generating two signals: One "A signal any edge" (A_AE in this embodiment) and "B signal any edge" (B_AE in this embodiment). In the preferred embodiment, this synchronization and edge-detection is achieved by a synchronous state machine, which is toggled according to the following algorithm as implemented by commutation control unit 120:

Toggle
$MOT\_ENC = (A\_AE \& -MOT\_ENC) + (B\_AE \& MOT\_ENC)$

The effect of the algorithm above is that once an A edge is detected, CSG/JS 214 looks only for B edges and similarly, once a B edge is detected, CSG/JS 214 looks only for A edges. Multiple subsequent edges on the same input have no effect, thereby eliminating the potential noise problem.

In the preferred embodiment, the above procedure is implemented by logic gates and flip-flops in edge detector 210 and CSG/JS 214.

Rotation direction detector 212 includes a direction latch 222 coupled to an interrupt/status register 224. The phase shift of the B signal relative to the A signal is +90° in the forward direction and −90° in the reverse direction. Commutation control unit 120 determines motor rotation direction by utilizing information from both A and B channels. If the A signal phase leads the B signal, rotation is in one direction; if the A signal phase lags the B signal, rotation is in the opposite direction. An embodiment of this invention implements this in the manner described following.

The A and B inputs from MR encoder 110 are edge-detected by edge detector 210, generating four signals: "A signal leading edge" (A_LE), "A signal trailing edge (A_TE), "B signal leading edge" (B_LE), and "B signal trailing edge" (B_TE). Direction latch 222 is set and reset according to the following algorithm which is implemented in commutation control unit 120:

Set the
latch $= (A \& B\_LE) + (-A \& B\_TE) + (-B \& A\_LE) + (B \& A\_TE)$

Clear the
latch $= (-A \& B\_LE) + (A \& B\_TE) + (-B \& A\_LE) + (-B \& A\_TE)$ Also, direction latch 222 is constrained to change only when the composite motor-encode signal is also changing, so that these two signals always have consistent status and are jitter-immune. The output of direction latch 222 becomes the forward/reverse bit in interrupt/status register 224, which is 1 when motor 101 is rotating forward and 0 for the reverse motor rotation direction. Thus the rotation direction of motor 101 is determined by rotational direction detector 212.

In the preferred embodiment, the above-described procedure is implemented by logic gates and flip-flops.

In the preferred embodiment, the angular position of the rotor in motor 101 is tracked utilizing a counter. Rotational position counter 216 is controlled to maintain a value proportional to the angular position of the motor rotor in the following manner.

Counter 216 counts modulo the number of encoder signal edges in one revolution of the rotor. Counter 216 is incremented by 1 each time an encoder signal edge is detected when the rotation is in a clockwise direction, except that (1) the first encoder signal edge after a direction change is ignored (as described above), and (2) counter 216 is incremented by 2 when the second encoder signal edge is detected after a change in direction from counter-clockwise to clockwise. Counter 216 is decremented by 1 each time an encoder signal edge is detected when the direction of rotation is counter-clockwise, except that (1) the first encoder signal edge after a direction change is ignored (as described above), and (2) counter 216 is decremented by 2 when the second encoder signal edge is detected after a change in direction from counter-clockwise to clockwise In the preferred embodiment, the above-described procedure is implemented by programming processor 205. If the rotor in motor 101 rotates too rapidly for processor 205 to handle, a prescaler 218 (such as a dividing circuit) can be added to decrease the number of counts transmitted to processor 205.

In operation, upon power-up, rotational position counter 216 is synchronized to the optimal commutation points utilizing the following procedure: First, coil 1 is energized, thereby pulling the rotor to a stable low-energy point relative to the coils. The optimal commutation points are then chosen as given values of the counter offset from this low-energy position (given knowledge of motor specification, i.e., number of coils, magnets, and configuration). With coil 1 energized and the motor idle, rotational position counter 216 is loaded with a number such that the first optimal commutation point in the clockwise direction occurs when counter 216 rolls over to 0. For rotation in the clockwise direction, commutation control unit 120 causes the next coil set to be energized in ascending sequence each time rotational position counter 216 reaches a commutation point. For rotation in the counter-clockwise direction, commutation control unit 120 causes the next coil set to be energized in descending sequence each time rotational position counter 216 reaches a commutation point. In the preferred embodiment, these operations are implemented by programming processor 205.

An embodiment of this invention can be found in Digital Data Tape Storage System Model RB100 manufactured by R-Byte of San Jose, Calif.

While the above description provides a full and complete description of the preferred embodiments of the present invention, various modifications, alternate constructions, and equivalents may be employed while still remaining within the scope of the invention. For example, although the instructions are in most part performed digitally by a processor, any suitable means of implementing the described functions is within the scope of the invention. Further, although the examples describe substantially sinusoidal encoder signals, any type of periodic or pulse signals can be advantageously utilized by this invention and the signals may be generated by any type of suitable encoder or signal generator. Therefore, the above description and illustrations should not be construed as limiting the scope of the invention which is defined by the following claims.

What is claimed is:

1. A jitter suppressor for a brushless dc motor having a rotor and a plurality of coils, coupled to an encoder generating quadrature signals A and B having edges being the zero crossings of the signals, responsive to the rotation of the rotor, comprising:
   synchronization means, coupled to the encoder, for synchronizing the quadrature signals; and
   edge detector means, coupled to said synchronization means, for detecting only B edges after an A edge is detected and detecting only A edges after a B edge is detected.

2. A method of jitter suppression for a brushless dc motor having a rotor and a plurality of coils, coupled to an encoder generating quadrature signals A and B having edges being the zero crossings of the signals, responsive to the rotation of the rotor, said method comprising the steps of:
   synchronizing the quadrature signals;
   detecting only B edges after an A edge is detected; and detecting only A edges after a B edge is detected.

3. A method for commutation of a brushless dc motor having a rotor and a plurality of coils, coupled to an encoder generating quadrature signals responsive to the rotation of the rotor and a rotational position counter, said method comprising the steps of:
   energizing a first coil of the motor, thereby pulling the rotor to a stable low-energy point relative to the coils;
   choosing the optimal commutation points as given values of the counter offset from this low-energy position from knowledge of motor specification;
   loading the counter with a number such that the first optimal commutation point in the clockwise direction occurs when the counter rolls over to 0;
   energizing the next coil in ascending sequence each time the counter reaches a commutation point; and
   energizing the next coil in descending sequence each time the counter reaches a commutation point in the counter-clockwise direction.

* * * * *